July 23, 1968   F. L. THEYLEG   3,393,783

TRANSVERSELY ENGAGED CAM OPERATED FRICTION CLUTCH

Filed Nov. 21, 1966

INVENTOR:
FRANK L. THEYLEG
BY
ATTORNEYS.

United States Patent Office

3,393,783
Patented July 23, 1968

1

3,393,783
TRANSVERSELY ENGAGED CAM OPERATED FRICTION CLUTCH
Frank L. Theyleg, Farmington, Mich., assignor to Ford Motor Company, Dearborn, Mich., a corporation of Delaware
Filed Nov. 21, 1966, Ser. No. 595,750
6 Claims. (Cl. 192—78)

ABSTRACT OF THE DISCLOSURE

A friction clutch for use in a geared, multiple-ratio, power transmission mechanism, including a friction ring carried by one clutch member, a circular friction surface formed on a companion clutch member and clutch actuators adapted to engage the clutch members with a radial engaging force.

*Summary of the invention*

In a manually-controlled, multiple-ratio power transmission mechanism for automotive vehicles there usually is provided a power input gear, which is driven by the engine, and a transmission mainshaft located coaxially with respect to the input gear. The power output shaft of the transmission mechanism is connected to the mainshaft. A transmission countershaft, which is mounted for rotation about an axis that is parallel to the axis of the input gear, journals a multiple gear element cluster gear assembly the gear elements of which engage continuously the input gear and intermediate gears journaled on the mainshaft.

By means of synchronizer clutch assemblies the gears journaled on the mainshaft can be clutched selectively to the mainshaft thereby establishing and disestablishing the various ratios in the driveline. To accomplish such ratio shifts, however, it is necessary in prior art systems to interrupt the torque delivery path through the driveline by disengaging a neutral clutch situated between the engine and the input gear. One ratio is disestablished and the other ratio is established while the clutch is disengaged. Upon re-engagement of the neutral clutch, the driveline is capable of operating in a different drive ratio.

The improved clutch mechanism of my invention can be used in lieu of conventional synchronizer clutches in a transmission mechanism of this type. The clutch can be activated and de-activated by a simple control function to provide a rapid ratio-shift while the driveline is delivering torque. No torque interruption is required.

The provision of a power clutch mechanism of the type above described being a principal object of my invention, it is a further object of my invention to provide a transmission clutch mechanism of relatively reduced size for any given torque transmitting capacity when compared to conventional transmission synchronizer clutches.

It is another object of my invention to provide a clutch mechanism for connecting selectively a torque delivery shaft to a torque delivery drive gear rotatably mounted with respect to the shaft and wherein provision is made for activating and deactivating the clutch structure with a simple control function.

It is a further object of my invention to provide a clutch of the type above described wherein a friction ring is situated eccentrically with respect to the shaft within a friction surface formed in the gear and wherein provision is made for expanding the transverse dimension of the friction ring to produce a driving relationship between the gear and the shaft.

2

*Particular description of the invention*

Figure 1:
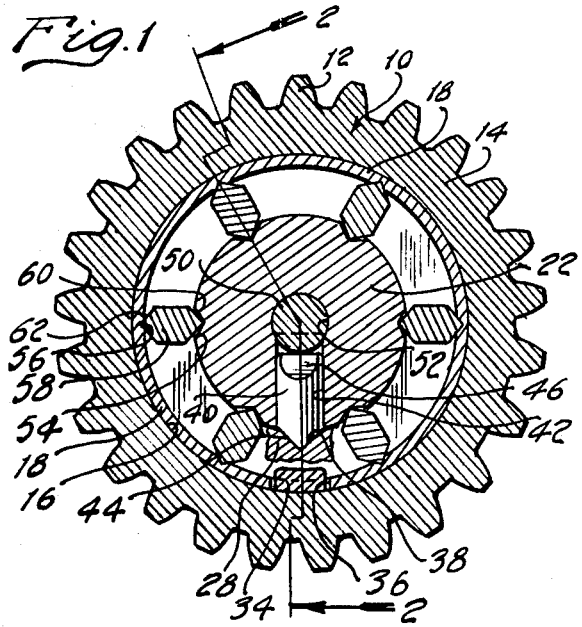
FIGURE 1 shows in transverse, cross-sectional form a gear-and-shaft assembly together with a friction clutch structure capable of establishing and disestablishing a driving connection between the shaft and the gear.

In FIGURE 1 a torque delivery gear is designated generally by reference character 10. It includes external involute teeth 12 and a hub 14. The hub is formed with a central circular bore 16 having a cylindrical wall at its outer periphery which forms one friction surface of the clutch structure. A circular clutch ring 18 is located within the bore 16. It is formed with a close clearance with respect to the cylindrical peripheral surface of the bore 16.

The hub 14 includes also a smaller diameter central opening 20 through which torque delivery shaft 22 extends. Hub 14 is journaled on the shaft 22 for rotation. It is held axially fast against displacement in one direction by thrust ring 24, which in turn is held in place by a snap ring 26.

On the other side of the hub 14 there is positioned an actuator ring 28. This includes a central opening 30 through which the shaft 22 extends. Ring 28 is journaled for relative angular displacement with respect to the shaft 22, although it is held axially fast with respect to the shaft 22 by a shoulder 32. The ring 28 extends inwardly with respect to the bore 16. A clearance at 33 is provided between the telescoping portion of the ring 28 and the surrounding portion of the bore 16.

Figure 3:
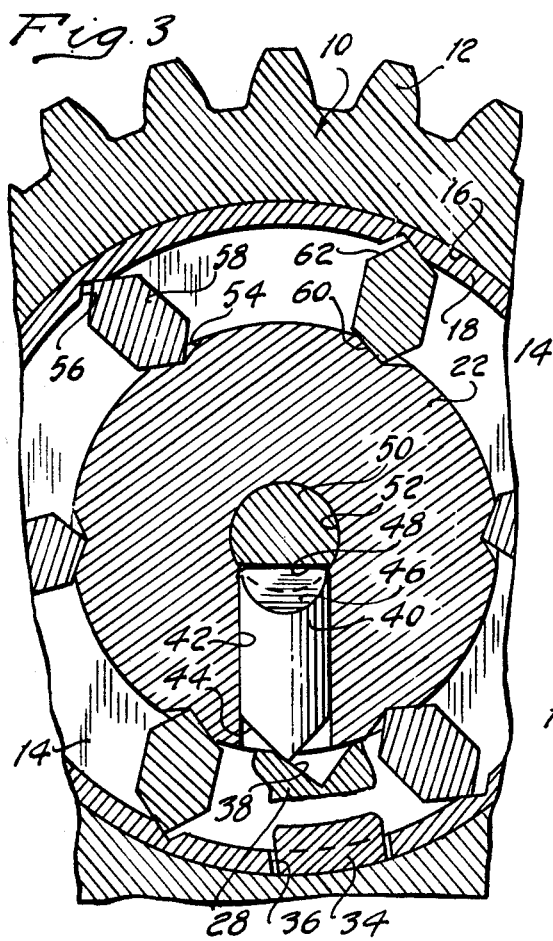
FIGURE 3 is a view showing a part of the assembly of FIGURE 1 with the gear and the shaft angularly displaced in one direction with respect to each other.
Figure 4:
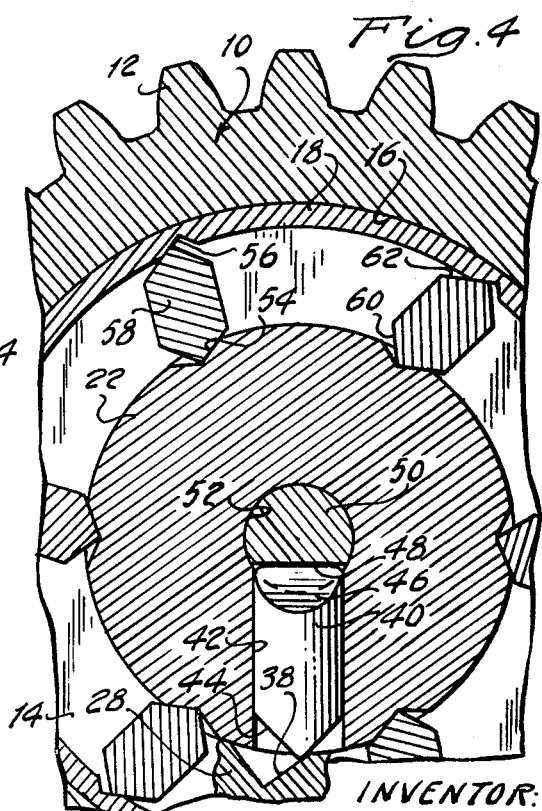
FIGURE 4 is a view similar to FIGURE 3, although the angular displacement of the gear with respect to the shaft is in an opposite sense.

Ring 28 is formed with a drive lug 34 which is received within a slot or recess 36 formed in the ring 18. This is best seen in FIGURES 3 and 4. A driving relationship thus is established between the ring 18 and the ring 28.

Ring 28 is formed with a cam recess 38 as seen best in FIGURES 3 and 4.

A synchronizer pin 40 is slidably received within a radial opening 42 formed in shaft 22. Pin 40 is formed with a double tapered nose 44 which is adapted to register with the cam recess 38. The radially inward end of pin 40 also is formed with double tapers as shown at 46. This end is adapted to register with a cam recess 48 formed in an actuator rod 50. The rod is slidably received within a central opening 52 formed in the shaft 22.

Figure 2:
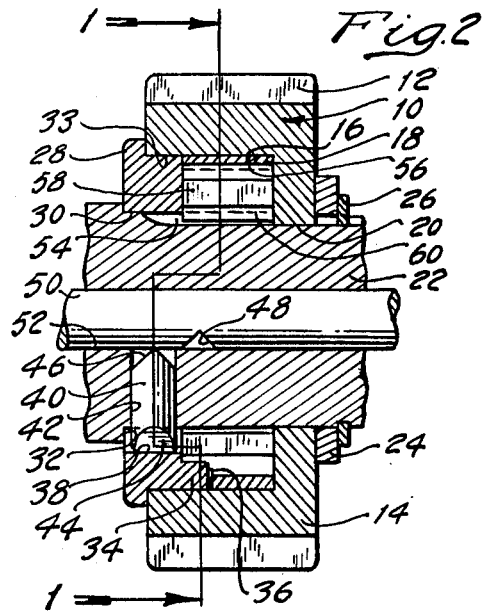
FIGURE 2 is a longitudinal, cross-sectional view taken along the plane of section line 2—2 of FIGURE 1.

Rod 50 can move axially with respect to the shaft 22. When it is positioned as shown in FIGURE 2, the radially inward end of the pin 40 is engaged by the outer surface of the rod 50. This causes pin 40 to be moved radially outwardly so that the tapered end or nose 44 is brought into registry with the recess 38. This causes the ring 28 to shift angularly to a central or neutral position. When it does this the lug 34 will cause the ring 18 also to shift in unison with the shifting movement of ring 28. On the other hand, if the rod 50 is shifted in a left-hand direction as viewed in FIGURE 2, the radially inward end of the pin 40 will register with the recess 48. This will allow the pin 40 to move radially inwardly with respect to the axis of shaft 22. The nose 44 then is withdrawn from recess 38. Shifting movement of the ring 28 with respect to the shaft 22 then can occur.

In FIGURE 3 the ring 28 is shifted in a counterclockwise direction with respect to the shaft 22. In FIGURE 4 the ring 28 is shifted in an opposite sense with respect to the position shown in FIGURE 3.

Shaft 22 is formed with angularly spaced notches 54. Similarly, the inner periphery of the ring 18 is formed with notches 56. The notches 56 are aligned radially, as seen in FIGURE 1, with respect to the notches 54.

Thrust elements 58 are located between the shaft 22 and the ring 18. They are formed with tapered ends, as indicated at 60 and 62 which register with the notches or recesses 54 and 56, respectively. When the elements 58 are positioned as shown at FIGURE 1, the apices of the tapered ends 60 and 62 are aligned radially. No radial pressure then is exerted on the ring 18 in a radial direction by the elements 58. If, however, the shaft 22 should become displaced angularly with respect to the ring 18, a camming action will be established between the tapered end 60 of the elements 58 and the cooperating recesses 54 in the shaft 22. A corresponding camming action will be established between the tapered ends 62 of the elements 58 and the recess 56 on the ring 18. This camming action creates radially directed forces through the elements 58 which act upon the ring 18 thereby deforming it. This causes frictional contact between the outer surface of the ring 18 and the inner cylindrical surface of the bore 16. A frictional driving relationship then is established between the gear 10 and the shaft 22.

If torque is being delivered, for example, from shaft 22 to the gear 10 in a clockwise direction, the element 58 will assume the position shown in FIGURE 3. If the torque is being delivered in the opposite sense, however, the position of the elements 58 will be as shown in FIGURE 4. The tolerance or clearance between the outer diameter of the ring 18 and the internal diameter of the bore 16 is sufficiently close so that the deformation of the ring 18 to the out-of-round condition it assumes during clutch engagement will develop sufficient torque transmitting capacity between the shaft 22 and the gear 10. To establish a clutching condition, the shaft or rod 50 is shifted until the recess 48 registers with the inner end of the pin 40. To effect clutch disengagement it is merely necessary to move the rod 50 in either one direction or the other thereby causing the nose 44 to register with the recess 38. This causes the ring 28 to become centered because of the camming action that then is established by the nose 44. As the ring 28 becomes centered, the lug 34 returns the ring 18 to the position shown in FIGURE 1 where the apices of the cam ends 60 and 62 are in radial alignment.

Rod 50 can be actuated in one direction or the other while torque is being delivered between shaft 22 and gear 10. No torque interruption is required to accomplish a disengagement or an engagement of the clutch. The engagement and disengagement occurs substantially instantaneously. It is not necessary, therefore, to establish synchronism between the motion of the gear and the shaft prior to the clutching action as is the case with conventional synchronizer clutch mechanisms in environments of this type. The engagement occurs by reason of the wedging action established by the elements 58 immediately upon relative displacement of the shaft 22 with respect to the gear 10. It is this wedging action that establishes a radial force which in turn deforms the ring 18 and establishes a frictional drive between the ring 18 and the friction surface of the bore 16.

Having thus described a preferred form of my invention, what I claim and desire to secure by U.S. Letters Patent is:

1. A clutch assembly adapted to deliver driving torque from a driving member to a driven member comprising an internal frictional surface formed in one of said members, the other of said members being disposed coaxially with respect to said friction surface, a friction ring situated in said one member within said friction surface, a plurality of cammed recesses formed in said other member, a plurality of other recesses formed in the inner peripheral surface of said ring, torque delivery wedge elements located between said ring and said other member, said wedge elements having cammed ends registering respectively with the recesses formed in said other member and in said ring whereby relatively angular movement of said members will tilt said wedge elements thereby creating radial thrust forces on said ring causing it to deform and to frictionally engage the surrounding friction surface in said one member, a cam operating ring surrounding said other member and coaxially disposed with respect thereto, a positive mechanical connection between said operating ring and said friction ring, and means for shifting said operating ring with respect to said other member whereby said wedging elements can be rotated to a neutral position to effect clutch disengagement.

2. A clutch assembly adapted to deliver driving torque from a driving member to a driven member comprising an internal frictional surface formed in one of said members, the other of said members being disposed coaxially with respect to said friction surface, a friction ring situated in said one member within said friction surface, torque delivery wedge elements located between said ring and said other member, said wedge elements having cammed ends engaged respectively with the other member and said ring whereby relatively angular movement of said members will tilt said wedge elements thereby creating radial thrust forces on said ring causing it to deform and to engage the surrounding friction surface in said one member, a cam operating ring surrounding said other member and coaxially disposed with respect thereto, a positive mechanical connection between said operating ring and said friction ring, and means for shifting said operating ring with respect to said other member whereby said wedging elements can be rotated to a central neutral position to effect clutch disengagement.

3. The combination set forth in claim 1 wherein said shifting means comprises a clutch operating pin mounted for radial movement within said other member, a cammed nose formed on the radially outward end of said pin, a cam recess formed in said operating ring adjacent said nose and in registry therewith, and an axially movable rod movably mounted in said other member for axial displacement with respect to said other member, said rod having formed therein a cam recess adapted to register with the radially inward end of said pin thereby permitting said pin to withdraw from the cooperating recess in said operating ring thus effecting relative angular displacement of said circular ring with respect to said other member as said clutch assembly becomes engaged.

4. The combination set forth in claim 2 wherein said shifting means comprises a clutch operating pin mounted for radial movement within said other member, a cammed nose formed on the radially outward end of said pin, a cam recess formed in said operating ring adjacent said nose and in registry therewith, and an axially movable rod movably mounted in said other member for axial displacement with respect to said other member, said rod having formed therein a cam recess adapted to register with the radially inward end of said pin thereby permitting said pin to withdraw from the cooperating recess in said operating ring thus effecting relative angular displacement of said operating ring with respect to said other member as said clutch assembly becomes engaged.

5. A clutch assembly adapted to deliver driving torque from a driving member to a driven member comprising an internal friction surface formed in one of said members, the other of said members being disposed coaxially with respect to said friction surface, a friction ring situated in said one member within said friction surface, a plurality of cammed recesses formed in said other member, a plurality of other recesses formed in the inner peripheral surface of said ring, torque delivery wedge elements located between said ring and said other member, said wedge elements having cammed ends registering respectively with the recesses formed in said other member and in said ring whereby relatively angular movement of said members will tilt said wedge elements thereby creating radial thrust forces on said ring causing it to deform and to frictionally engage the surrounding friction surface in said one member, said assembly comprising a clutch operating pin mounted for radial movement within said other member, a cammed nose formed on the radially outward end of said pin, an operating ring connected to said friction ring and coaxial therewith, a cam recess formed in said operating ring adjacent said nose and in registry therewith, and an axially movable rod movably mounted in said other member for axial displacement with respect thereto, said rod having formed therein a cam recess adapted to register with the radially inward end of said pin thereby permitting said pin to withdraw from the cooperating recess in said operating ring thus effecting relative angular displacement of said friction ring with respect to said other member as said friction surface becomes engaged.

6. A clutch assembly adapted to deliver driving torque from a driving member to a driven member comprising an internal frictional surface formed in one of said members, the other of said members being disposed coaxially with respect to said friction surface, a friction ring situated in said one member within said friction surface, a plurality of cammed recesses formed in said other member, a plurality of other recesses formed in the inner peripheral surface of said ring, torque delivery wedge elements located between said ring and said other member, said wedge elements having cammed ends registering respectively with the recesses formed in said other member and in said ring whereby relatively angular movement of said members will tilt said wedge elements thereby creating radial thrust forces on said ring causing it to deform and to frictionally engage the surrounding friction surface in said one member, a cam operating ring surrounding said other member and coaxially disposed with respect thereto, a positive mechanical connection between said operating ring and said friction ring, and means for shifting said operating ring with respect to said other member whereby said wedging elements can be rotated to a neutral position to effect clutch disengagement, said shifting means comprising a clutch operating pin mounted for radial movement within said other member, a cammed nose formed on the radially outward end of said pin, a cam recess formed in said operating ring adjacent said nose and in registry therewith, and an axially movable rod movably mounted in said other member for axial displacement with respect to said other member, said rod having formed therein a cam recess adapted to register with the radially inward end of said pin thereby permitting said pin to withdraw from the cooperating recess in said operating ring thus effecting relative angular displacement of said circular ring with respect to said other member as said clutch assembly becomes engaged.

References Cited

UNITED STATES PATENTS

| 247,896 | 10/1881 | Ellis et al. | 192—41 |
| 309,740 | 12/1884 | Racine | 192—41 |
| 2,021,921 | 11/1935 | Osterholm | 192—41.3 |

FOREIGN PATENTS

| 412,898 | 7/1934 | Great Britain. |

BENJAMIN W. WYCHE III, *Primary Examiner.*

L. J. PAYNE, *Assistant Examiner.*